(12) United States Patent
Weinberg

(10) Patent No.: US 9,168,885 B2
(45) Date of Patent: Oct. 27, 2015

(54) METHOD FOR POWER MANAGEMENT OF WIRELESS AUTOMOTIVE MODULES

(71) Applicant: Analog Devices, Inc., Norwood, MA (US)

(72) Inventor: Harvey Weinberg, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 127 days.

(21) Appl. No.: 13/934,364

(22) Filed: Jul. 3, 2013

(65) Prior Publication Data

US 2015/0012184 A1 Jan. 8, 2015

(51) Int. Cl.
*B60R 22/00* (2006.01)
*B60R 21/017* (2006.01)
*B60R 16/00* (2006.01)
*B60R 21/01* (2006.01)

(52) U.S. Cl.
CPC ............. *B60R 21/017* (2013.01); *B60R 16/005* (2013.01); *B60R 2021/01286* (2013.01)

(58) Field of Classification Search
CPC ............................... G01M 17/02; B60C 23/00
USPC ................. 701/45, 117, 23, 28; 280/734, 735
See application file for complete search history.

(56) References Cited

U.S. PATENT DOCUMENTS

| | | | |
|---|---|---|---|
| 7,549,327 B2 | 6/2009 | Breed | 73/146 |
| 8,171,791 B2 * | 5/2012 | Sy et al. | 73/488 |
| 8,400,289 B2 * | 3/2013 | Heise et al. | 340/447 |
| 2013/0328674 A1 | 12/2013 | McIntyre et al. | 340/442 |

* cited by examiner

*Primary Examiner* — Thomas G Black
*Assistant Examiner* — Luke Huynh
(74) *Attorney, Agent, or Firm* — Sunstein Kann Murphy & Timbers LLP

(57) ABSTRACT

A satellite sensor system for a vehicle includes an application motion sensor for sensing vehicle motion for the purpose of activating a vehicle safety system, a low power consumption motion sensor for monitoring vehicle motion when the vehicle is parked or otherwise not in a driving mode, and an RF communications interface to allow the satellite sensor system to communicate with the vehicle's electronics control unit. The system withholds power from the application sensor until the low power consumption motion sensor indicates that the vehicle is about to enter a driving mode.

20 Claims, 4 Drawing Sheets

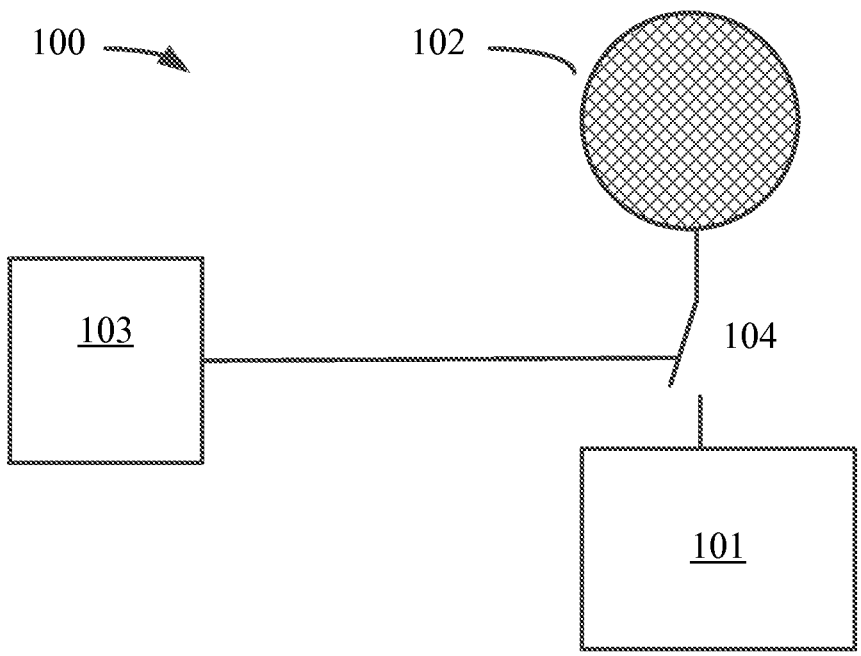
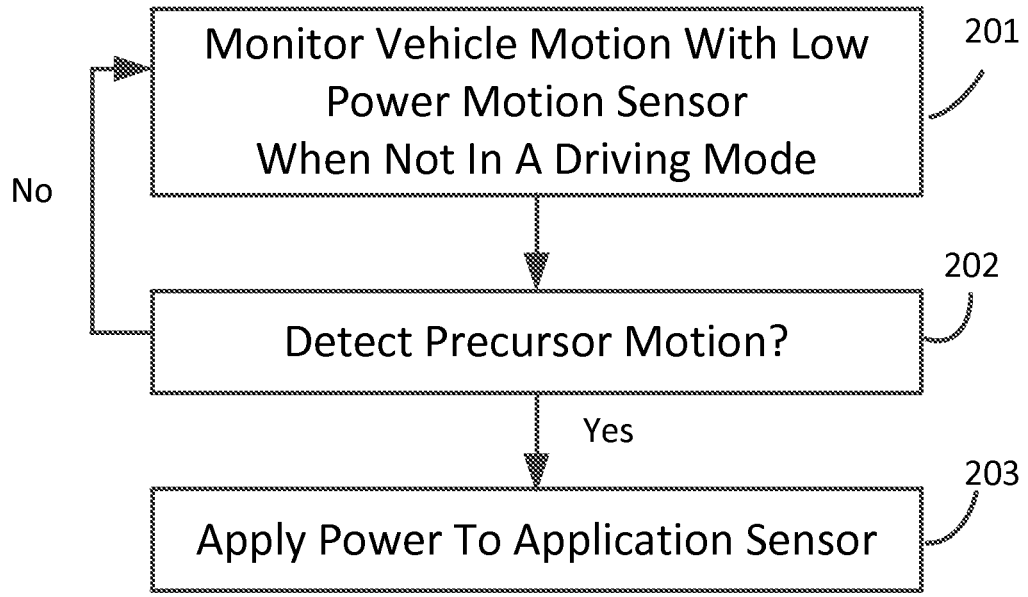

METHOD FOR POWER MANAGEMENT OF WIRELESS AUTOMOTIVE MODULES

TECHNICAL FIELD

The present invention relates to MEMS sensors, and more particularly to satellite sensors in motor vehicles.

BACKGROUND ART

It is known in the prior art to provide operating power to satellite sensors in vehicle through the vehicle's wiring harness. As such, satellite sensors draw power from the vehicle's main power system (e.g., the vehicle's battery or batteries, or alternator). However, it is also known that a vehicle's wiring harness is—undesirably—a significant contributor to the vehicle's weight.

Some satellite sensors draw power from an energy harvesting device that converts vehicle motion into power for the sensor. However, this requires that the sensor and energy harvesting device be mounted in a location that provides the necessary motion. Such locations are not viable for some sensors, such as sensors for which such motion may complicate the sensing of the sensor's target measurand.

SUMMARY OF THE EMBODIMENTS

In a first embodiment, a method of managing power in an application sensor in a vehicle includes the steps of powering a low-power MEMS sensor from a from a local energy storage device; monitoring, using the low-power MEMS sensor, at least one motion of the vehicle when the vehicle is stationary; and increasing power supply to application sensor if the low-power MEMS sensor detects at least one precursor motion. In some embodiments, the local energy storage device is a battery.

In some embodiments, the step of increasing power supply to application sensor includes supplying power to the application sensor from the local energy storage device.

In some embodiments, the step of providing power to the low-power MEMS sensor includes providing power to the low-power MEMS sensor only when the vehicle is not operating in a driving mode, while in some embodiments it includes withholding power from the local energy source when the application sensor detects vehicle motion when the vehicle is in a driving mode.

Some embodiments include further steps after increasing power supply to application sensor. For example, some embodiments include the step of establishing a wireless communications link between the application sensor and an electronics control unit via the wireless communications interface, while other embodiments include monitoring at least one motion of the vehicle with the application sensor, and putting the application sensor into a hibernation mode if the application sensor detects that the vehicle is not in a driving mode.

The precursor motions may include motions such as (i) a vehicle door opening; (ii) a vehicle door closing; (iii) an occupant entering a driver's seat; and (iv) a vehicle motor being engaged. In some embodiments, the step of increasing power supply to application sensor if the low-power MEMS sensor detects at least one precursor motion includes increasing power supply to application sensor only if the low-power MEMS sensor detects at least two precursor motions.

In another embodiment, a wireless application sensor system for triggering a safety system in a vehicle includes a low-power MEMS sensor rigidly affixed to a fixed location on the vehicle and configured to monitor at least one motion of the vehicle when the vehicle is stationary; a MEMS application sensor, the MEMS application sensor being separate from the low-power MEMS sensor; a local energy storage device, the local energy storage device configured to supply power to the low-power MEMS sensor and to the application sensor; a wireless communications interface circuit operably coupled to the application sensor and configured to provide a communications link to an electronic control unit in the vehicle; and a control module configured to engage the application sensor when the low-power MEMS sensor detects a precursor motion, wherein the electronic control unit is configured to control a safety system in the vehicle in response to a signal from the application sensor. In some embodiments, engaging the application sensor includes increasing power from the local energy storage device to the application sensor. For example, in some embodiments, the system also includes a switch operably connected between the application sensor and the local energy storage device, the switch configured to controllably conduct electrical energy from the local energy storage device to the application sensor under control of the control module.

Some embodiments include circuits for processing the output from the lower-power MEMS sensor. For example, some embodiments include an analog-to-digital converter configured to convert an output signal from the low-power MEMS sensor to a digital format, and to provide the digitized output signal to the control module. Other embodiments include a comparator configured to compare and output of the low-power MEMS sensor to a predetermined level, and to provide the result of the comparison to the control module.

Some embodiments also include a processor operably coupled to the application sensor, the processor configured to control the application sensor. To further manage the system's power consumption, the control module in some embodiments is further configured to provide power to the processor when the low-power MEMS sensor detects a precursor motion.

In another embodiment, a system for controlling a safety system in a vehicle includes a low-power-consumption means for monitoring at least one motion of the vehicle when the vehicle is stationary; an application sensor means, the application sensor means being separate from low-power-consumption means; a local energy storage means, the local energy storage means configured to supply power to the low-power MEMS sensor and to the application sensor; a wireless communications interface means operably coupled to the application sensor means and configured to provide a communications link to a safety system controller in the vehicle; and a control means configured to selectively supply power from the local energy storage means to the application sensor means when the low-power consumption means detects a precursor motion, wherein the safety system controller is configured to control a safety system in the vehicle in response to a signal from the application sensor means.

Some embodiments also include a switching means operably connected between the application sensor means and the local energy storage means, the switching means configured to controllably conduct electrical energy from the local energy storage means to the application sensor means under control of the control means.

Some embodiments also include an analog-to-digital converter means configured to convert an output signal from the low-power-consumption means to a binary format, and to provide the binary signal to the control means.

Finally, some embodiments include a processor means operably coupled to the application sensor means, the processor means configured to control the application sensor means.

BRIEF DESCRIPTION OF THE DRAWINGS

The foregoing features of embodiments will be more readily understood by reference to the following detailed description, taken with reference to the accompanying drawings, in which:

FIG. 1 schematically illustrates an embodiment of a satellite sensor system according to a first embodiment;

FIG. 2 schematically illustrates an embodiment of a method of operation of a satellite sensor system;

DETAILED DESCRIPTION OF SPECIFIC EMBODIMENTS

Figure 3:
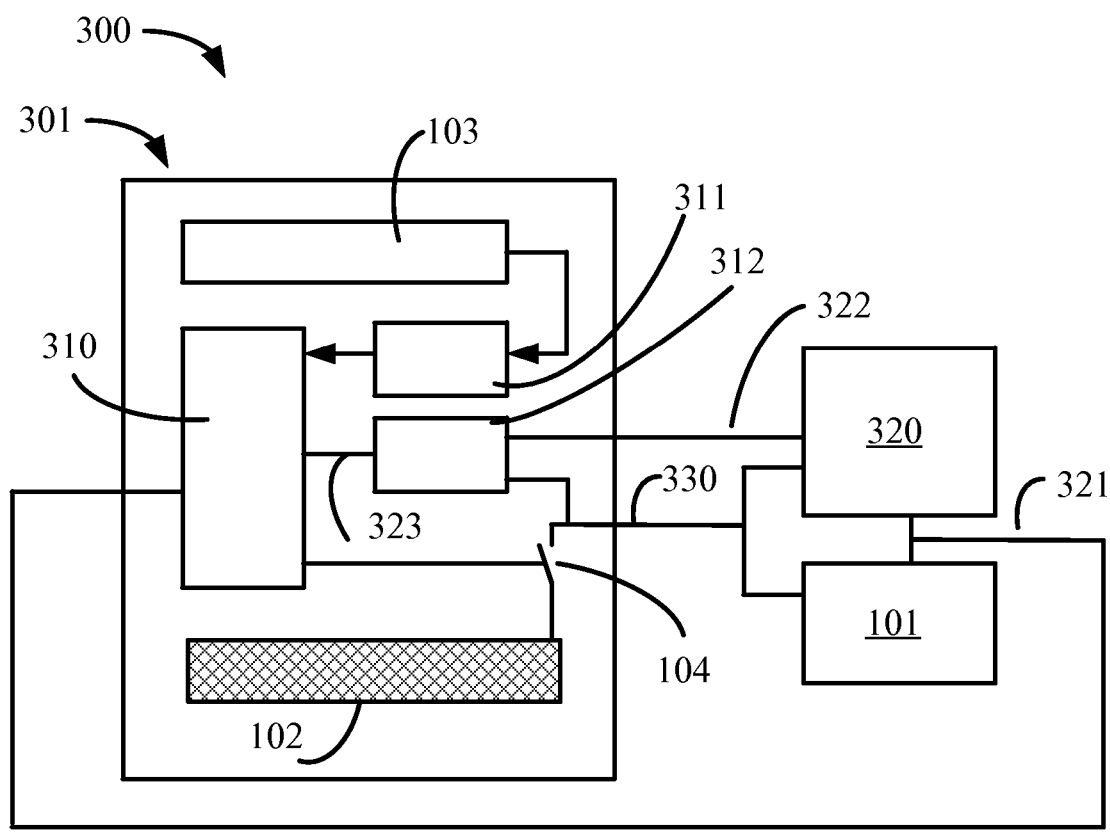
FIG. 3 schematically illustrates an embodiment of a satellite sensor system according to a second embodiment.

Various embodiments provide sensor systems that communicate wirelessly with a host vehicle, and yet are so energy efficient that they can operate for years in the host vehicle without requiring any power input from outside the sensor system. Because the systems do not require an energy harvesting device or a wiring harness to deliver operating power from the vehicle's power system, and because the systems do not require wiring to communicate with a vehicle's electronic control unit, such systems avoid the cost, weight and complexity of the wiring harnesses required for prior art systems, thereby making the vehicle lighter, less expensive, and less complex.

The inventor has realized that many vehicles, such as a typical family car, spend approximately 90% of their service life in a non-driving mode (i.e., parked, or otherwise not in a driving mode). When a vehicle is not in a driving mode, there may not be a need to supply power to many of the vehicle's sensors. For example, when a vehicle is not being driven, there may be no need to monitor for vehicle decelerations or other motions that might indicate a need to trigger a safety system, and so it may be desirable to withhold power from various satellite sensors that monitor such motions in the vehicle.

In addition, supplying power to a satellite sensor may be costly, both in terms of material and vehicle weight. In some vehicles, power may be supplied to satellite sensors via the vehicle's power system and wiring harness (which may also be known as a "wire harness"). Such a system may provide sufficient, and effectively unlimited, power from the car battery and alternator (e.g., in a vehicle with an internal combustion engine), or from the vehicle's power source (e.g., in the case of an electric vehicle). Beneficially, reducing power consumption by such vehicles may be accomplished by simply switching-off the power supplied via a wiring harness when the vehicle's engine or motor is disengaged.

However, it is known that a vehicle's wiring harness adds significant weight and some complexity to the vehicle. As such, eliminating or reducing the wiring harness may be beneficial.

The motions of a vehicle being driven are well known. Indeed, many safety systems are able to distinguish between the normal motions of a vehicle being driven, and abnormal motions, such a deceleration that might indicate a need to trigger an airbag system, or a rotation that might indicate a need to engage an anti-lock braking system.

The inventor has realized that knowledge of the motions of a vehicle being driven can also be used to distinguish between the vehicle being driven (i.e., the vehicle in a "driving mode") and a vehicle not being driven (for example e.g., when the vehicle is parked). The inventor has further realized that some motions that occur when a vehicle is not in a driving mode may be precursors to, or indicative of, a vehicle about to be put into a driving mode. Recognizing such motions may be useful in apply power to a satellite sensor at, or even before, a vehicle is put into a driving mode. As such, power may be withheld from a satellite sensor when the vehicle is not in a driving mode, but the satellite sensor may be powered-up before the vehicle is driven.

A system 100 for controlling power to a satellite sensor is schematically illustrated in FIG. 1, and includes an application sensor 101, a "local energy storage device" 102, and a low power motion sensor module 103.

Generally, an "application sensor" is a sensor (e.g., a micromachined or MEMS sensor) configured to sense one or more motions of a moving vehicle, and may include, without limitation, inertial sensors such as accelerometers and gyroscopes, bulk acoustic wave gyroscopes, etc. A "wireless MEMS application sensor" is a MEMS application sensor that includes (or is part of a system that includes) communications interface circuitry configured to communicate wirelessly with, for example, with an electronics control unit ("ECU") of a vehicle. Typically, an application sensor is configured to monitor vehicle motions that may indicate a need to deploy a safety system (e.g., a crash sensor configured to detect a sudden deceleration in order to deploy an air bag). In some embodiments, an application sensor may be configured to produce a digital output (e.g., it may include an analog-to-digital converter).

A "low power motion sensor" (e.g., module 103) is or includes a micromachined sensor configured to sense one or motions of a stationary vehicle or otherwise when the vehicle is in a non-driving mode, and which, in a sensing mode, draws less than 2 micro watts from a power source. The universe of low power motion sensors may include, without limitation, inertial sensors such as accelerometers and gyroscopes, bulk acoustic wave gyroscopes, etc. In illustrative embodiments, the low power motion sensor is a separate sensor from the application sensor, which is to say that they are not one and the same sensor.

In this embodiment, the application sensor does not receive power via a wiring harness, or otherwise from the vehicle's power system. Rather, both the low power motion sensor 103 and the application sensor 101 are powered by the local energy storage device 102. More particularly in this illustrative embodiment, power from the local energy storage device is controllably provided to the application sensor 101 via switch 104, under control of the low power motion sensor 103. The switch 104 may be a transistor (e.g., a FET), a micromachined switch or relay, or any of a variety of known switching means. An embodiment of such control is explained in more detail in connection with FIG. 2, below.

Generally, a "local energy storage device" is a device, such as a battery or capacitor, capable of storing energy over an extended period of time, such as two or more years, and in some embodiments 10, 11 or even more years, and which does not draw power from the vehicle's electrical system. For example, such a device may store energy in the form of chemical potential energy (e.g., a battery, or fuel cell) or in the form of electrical charge (e.g., a capacitor), to name but a few examples. A "local energy storage device" does not require motion to produce power (e.g., it is not a device that harvests energy from the motion of the vehicle, or a component of the vehicle). Examples of batteries suitable for various embodiments include so-called "coin" cells such as a 2032 coin cell or a 2450 coin cell, an lithium "AA" batteries, to name but a few examples.

An embodiment of a basic method of operation of the system 100 mounted in a vehicle may be described by the flow chart 200 in FIG. 2. The lower power motion sensor module 103 monitors motions of the vehicle when the vehicle is not in a driving mode (step 201). As such, the lower power motion sensor module 103 may detect motions that indicate that the vehicle is (or at least may be) about to be put into a driving mode. Such motions may include, for example, (i) a vehicle door opening; (ii) a vehicle door closing; (iii) an occupant entering a driver's seat; (iv) a vehicle motor being engaged; to name but a few examples. However, the foregoing list is not exhaustive. Motions that indicate that the vehicle is (or at least may be) about to be put into a driving mode may be referred to herein, generally, as "precursor motions."

If the lower power motion sensor 103 detects at least one precursor motion (step 202), then the system 100 engages (e.g., applies operating power to) the application sensor 101 from local power source 102, for example via switch 104 (step 203).

Given that a vehicle is not in a driving mode most of the time, and given the low power draw of the low power motion sensor 103, a system such as system 100 is capable of operating for extended times (e.g., 10 years or more) without requiring a change of power source, by preventing the application sensor 101 from drawing power when the vehicle is not in a driving mode, even though the low power motion sensor 103 draws a small amount of power when the vehicle is not in a driving mode.

An alternate embodiment of a satellite sensor system 300 is schematically illustrated in FIG. 3. In this embodiment, the features of system 100 of FIG. 1 (i.e., application sensor 101, energy storage device 102, low-power motion sensor 103, and switch 104) are packaged together in a common package or module (301), although that is not a limitation of the system 300.

The module 301 also includes a buffer, or signal processing circuit 311, that processes the signal output from the low-power motion sensor 103 and provides the processed signal to the controller 310. The signal processing circuit 311 may be an analog-to-digital converter, such that the processed signal is a digitized or binary expression of the signal output from the low-power motion sensor 103. Alternately, in some embodiments, the signal processing circuit 311 may be a comparator configured to compare the signal output from the low-power motion sensor 103 to a predetermined threshold, which threshold indicates a precursor motion.

Figure 4:
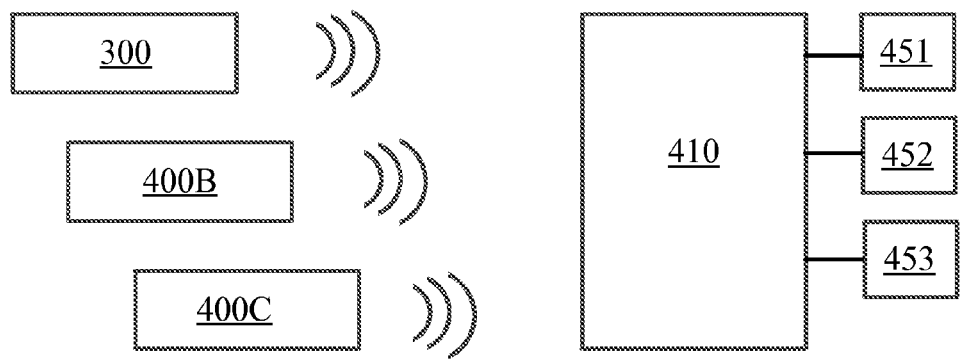
FIG. 4 schematically illustrates a vehicle system with multiple satellite sensor systems.

In addition, the module 301 includes an RF communications circuit 312 configured to allow the system 300 (e.g., application sensor 101 via bus 321, and/or the controller via bus 323) to communicate with an electronics control unit (or "ECU") such as ECU 410 schematically illustrated in FIG. 4, which may also receive wireless signals from a number of other satellite sensors (400B, 400C). The ECU 410, in turn, controls one or more safety systems 451, 452, 453 (e.g., airbags, seat-belt tensioner systems, vehicle stability control systems, anti-lock braking systems, to name but a few examples), based at least in part on information that is receives from the application sensor 101.

The controller 310 may be configured to coordinate various activities and circuits of the system 300. To that end, the controller may include a programmable processor and memory configured, or configurable, to perform its various functions. For example, the controller 310 may include a digital signal processor core, or other processor core such as an ARM core, or may be or include a microcontroller, to name but a few examples.

The controller 310 is configured to receive the output of the low-power motion sensor 103 in binary format from the signal processing circuit 311, and assess that data to determine whether the signal indicates a precursor motion. To that end, the controller 310 may also perform (e.g., be programmed to perform) signal conditioning on the digitized sensor signal.

When the controller 310 determines that the vehicle is not in a driving mode, the controller may reduce, remove or withhold power provided to various elements of system 300. For example, by opening switch 104, the controller 310 may withhold or remove power from the application sensor 101, satellite processor 320, and/or RF interface 312 (e.g., via power lines 330). Similarly, if and when the controller 310 determines that the vehicle is in a driving mode, the controller may increase or supply power provided to such elements of system 300. Although FIG. 3 schematically illustrates only a single switch 104, various embodiments may include more than one switch. For example, some embodiments may include individually-controllable switches for each element for which power may be controlled, all under the control of controller 310—e.g., a switch 104 between the energy storage device 102 and the application sensor 101 application sensor 102, another switch 104 between the energy storage device 102 and satellite processor 320, and another switch 104 between the energy storage device 102 and the RF interface 312. As such, the switch 104 schematically illustrated in FIG. 3 may, in various embodiments, represent many switches.

As schematically illustrated in FIG. 3, some embodiments also include a satellite processor 320, which may be any of a variety of known microprocessors or microcontrollers, or may be an integrated circuit that includes a digital signal processor core, or other processor core such as an ARM core, to name but a few examples. In various embodiments, the satellite processor may be part of, or entirely separate from, the controller 310.

The satellite processor 320 is configured to receive the output signal, or data representing the output signal, from the application sensor 101 via signal lines (or bus) 321. Alternately, or in addition, the satellite processor 320 and/or the application sensor 101 may be in digital communications with the controller 310, such that any of the digital functions described herein may performed by the processor 320, the controller 310, or divided or distributed between them.

The satellite processor 320 may then process the output signal from the application sensor 101, for example, to perform signal conditioning operations, such as filtering or modifying the signal to adjust for signal noise, or to adjust for operating parameters such as temperature or offset, etc.

The satellite processor 320 may also prepare the output signal from the application sensor 101 for transmission by the RF interface 312. For example, the satellite processor 320 may prepare the data for transmission in any of a variety of data transmission protocols, such as TDMA or CDMA, to name but a few examples. The satellite processor 320 may then send the data to the RF interface 312 via a data link 322.

A vehicle may have multiple wireless satellite sensor systems (300, 400B, 400C), each communicating with a common electronics control unit (410), as schematically illustrated in FIG. 4. The systems (e.g., 300, 400B, 400C, etc.)

may be configured to monitor a variety of vehicle parameters, such as various pressures, vehicle deceleration, roll or yaw, etc. Indeed, various embodiments may even include non-MEMS sensors in addition to, or in place of, the MEMS sensors described in the embodiments above, such as temperature sensors, power sensor, and liquid level sensors, to name but a few.

Figure 5:
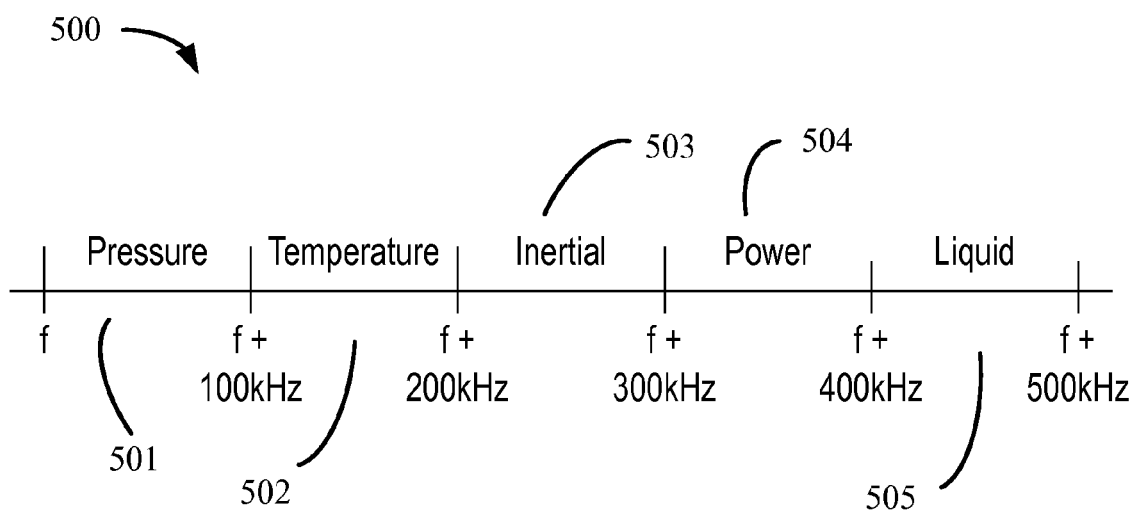
FIG. 5 schematically illustrates a communications spectrum for use by a multiple satellite sensor systems.

In some embodiments, the various satellite sensors may share the same RF spectrum 500. For example, as schematically illustrated in FIG. 5, the RF interface 312 in a pressure sensor may employ a first frequency channel 501, while the RF interface 312 in a temperature sensor may employ a second frequency channel 502, and the RF interface 312 in an inertial sensor system (e.g., system 300) may employ a third frequency channel 503, a power sensor may employ a fourth frequency channel 504, and a liquid level sensor may employ a fourth frequency channel 505, etc.

Figure 6:
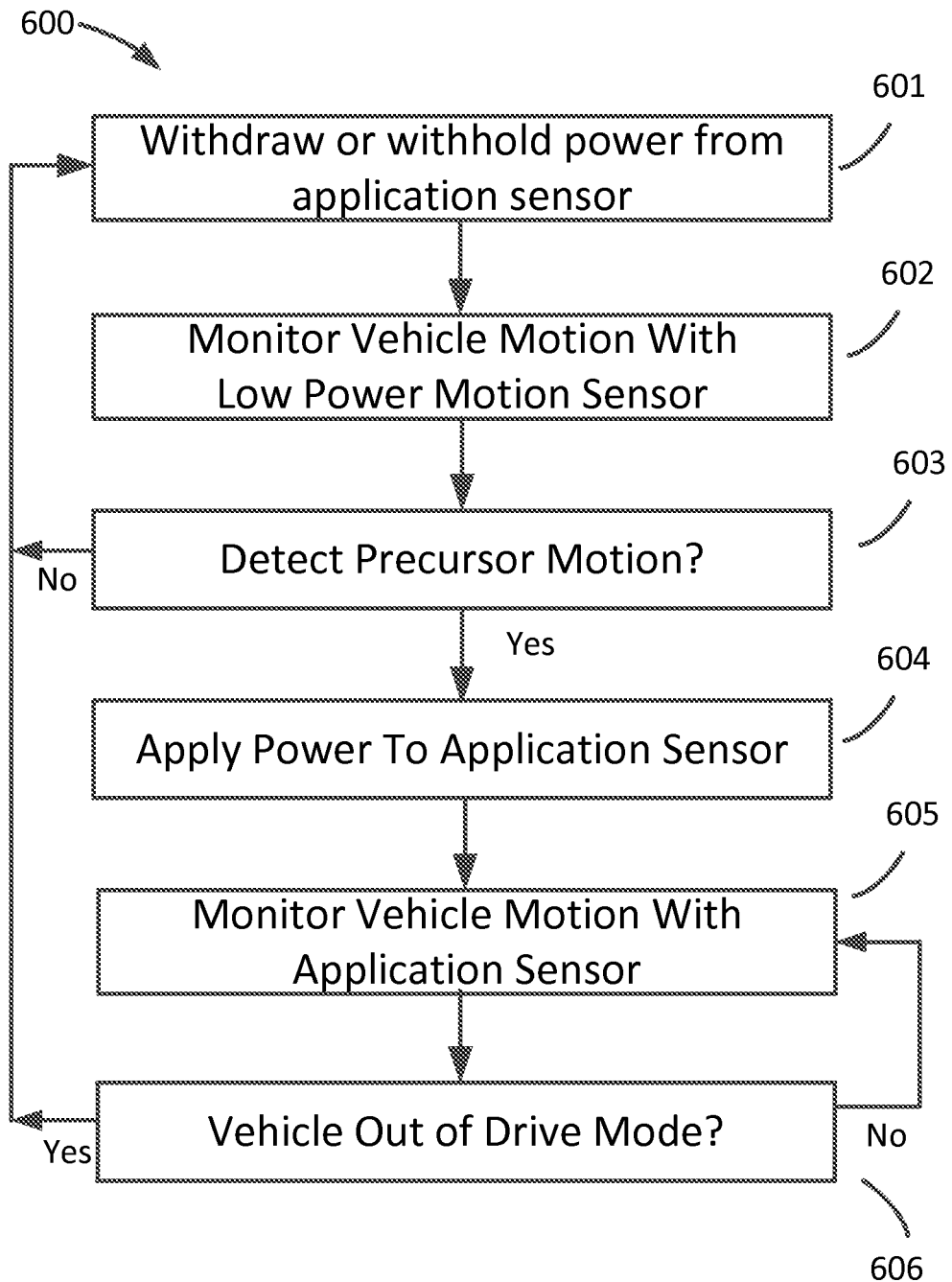
FIG. 6 schematically illustrates an embodiment of a method of operation of a satellite sensor system.

FIG. 6 is a flow chart that schematically illustrates an alternate method 600 of operation of a satellite sensor system. For purposes illustration, the description below refers to various components of various satellite sensor systems described above, although the method 600 is not limited to such embodiments.

Method 600 begins with a system in which power to an application sensor (e.g., 101) is being withheld (step 601). For example, this may be the case when the host vehicle is not in a driving mode.

A lower power motion sensor (e.g., 103) monitors the vehicles motion (step 602). The method determines whether the low power motion sensor (e.g., 103) has detected one or more precursor motions (step 603). If so, the method 600 applies power to the application sensor (step 604), and otherwise withdraws, or continues to withhold, power from the application sensor (step 601) and to monitor the vehicle motion (step 602).

When the application sensor is active (e.g., under power), the application sensor (e.g., 101) monitors one or more motions of the vehicle, for example to provide data that might be used to trigger a vehicle safety system (e.g., 451) (step 605). Further, when the application sensor (e.g., 101) is engaged, the satellite sensor system may also establish a wireless connection to an ECU (e.g., 410) or other electronic system in the vehicle.

In some embodiments, the method also uses the application sensor to determine whether the vehicle is or remains in a driving mode. If so, then the method continues to monitor the vehicle motion (step 605). Some embodiments may withhold power to the low power motion sensor when the vehicle is in a driving mode (optional at step 604 or step 605).

If the application sensor determines that the vehicle is no longer in a driving mode (step 606), then the method 600 puts the application sensor (and possibly other system circuitry, such as an RF interface, controller, or satellite processor etc.) into a hibernation mode by, for example, withholding power to the application sensor (step 601). If power has been withheld from the low power motion sensor during the driving mode, then power is restored to the low power motion sensor (optionally at step 601).

In short, various embodiments monitor vehicle motion with a low power-consumption motion sensor to gate power to an application sensor, and/or other circuits within a satellite sensor system. This allows the satellite sensor system to operate even without a connection to a vehicle's wiring harness since the satellite sensor system does not require power via such a wiring harness, and does not communicate with a vehicle's electronic systems via such a wiring harness.

Definitions. As used in this description and the accompanying claims, the following terms shall have the meanings indicated, unless the context otherwise requires:

A sensing device is fixedly attached to a vehicle when vibrations or motions of the vehicle are transmitted faithfully to the device. Vibrations or motions of the vehicle are transmitted faithfully to the device when such transmitted vibration or motion (e.g., the energy in such vibrations or motions) reaching a sensor is sufficient to be detected by a sensor configured to detect such vibrations or motions.

A "driving mode" of a vehicle is a mode in which the vehicle is moving, or is ready to be driven (e.g., while is it stopped at a traffic light). In a driving mode, a vehicle's dynamic safety systems, such as airbag systems, rollover detection systems, and antilock braking systems, are typically engaged. In a driving mode, vehicle sensors detect various vehicle motions, such as deceleration for triggering an air bag, or vehicle pitch or yaw to engage anti-lock braking systems, for example. A vehicle is not in a driving mode when it is parked, or has been stationary or unoccupied for a predetermined period of time.

A motion that indicates that the vehicle is entering (or may be about to enter) a driving mode is a vehicle motion that occurs prior to a vehicle entering a driving mode. For example, a person entering a driver's seat causes the vehicle to vibrate, and may cause the vehicle to dip to one side, or towards the front of the vehicle. Also, a vibration of a vehicle door (e.g., a driver's door) opening, or a vibration or shock of such a vehicle door closing, may indicate that the vehicle is about to be driven. Other such motions include, without limitation, vibrations caused by a vehicle motor being engaged (e.g., ignition of an internal combustion engine), or a motion of the vehicle as the vehicle begins to roll forward or backward on its wheels from stop. Such motions are examples of "precursor" motions.

A "hibernation mode" of a sensor is a mode in which the sensor consumes little or no power, for example when no power is supplied to the sensor.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of managing power in an application sensor in a vehicle, comprising:
   powering a low-power MEMS sensor from a local energy storage device;
   monitoring, using the low-power MEMS sensor, at least one motion of the vehicle when the vehicle is stationary; and
   increasing power supply to application sensor if the low-power MEMS sensor detects at least one precursor motion.

2. The method of claim 1, wherein powering the low-power MEMS sensor comprises providing power to the low-power MEMS sensor only when the vehicle is not operating in a driving mode.

3. The method of claim 1, wherein providing power to the low-power MEMS sensor comprises withholding power from the local energy source when the application sensor detects vehicle motion when the vehicle is in a driving mode.

4. The method of claim 1, further comprising, after increasing power supply to application sensor, establishing a wireless communications link between the application sensor and an electronics control unit via a wireless communications interface.

5. The method of claim 1, further comprising, after increasing power supply to application sensor, monitoring at least one motion of the vehicle with the application sensor, and putting the application sensor into a hibernation mode if the application sensor detects that the vehicle is not in a driving mode.

6. The method of claim 1, wherein the local energy storage device is a battery.

7. The method of claim 1, wherein increasing power supply to application sensor comprises supplying power to the application sensor from the local energy storage device.

8. The method of claim 1, wherein a precursor motion comprises at least one of (i) a vehicle door opening; (ii) a vehicle door closing; (iii) an occupant entering a driver's seat; and (iv) a vehicle motor being engaged.

9. The method of claim 8, wherein increasing power supply to application sensor if the low-power MEMS sensor detects at least one precursor motion comprises increasing power supply to application sensor if the low-power MEMS sensor detects at least two precursor motions.

10. A wireless application sensor system for triggering a safety system in a vehicle, comprising:
    a low-power MEMS sensor rigidly affixed to a fixed location on the vehicle and configured to monitor at least one motion of the vehicle when the vehicle is stationary;
    a MEMS application sensor, the MEMS application sensor being separate from the low-power MEMS sensor;
    a local energy storage device, the local energy storage device configured to supply power to the low-power MEMS sensor and to the application sensor;
    a wireless communications interface circuit operably coupled to the application sensor and configured to provide a communications link to an electronic control unit in the vehicle; and
    a control module configured to engage the application sensor when the low-power MEMS sensor detects a precursor motion,
    wherein the electronic control unit is configured to control a safety system in the vehicle in response to a signal from the application sensor.

11. The wireless application sensor system of claim 10, wherein engaging the application sensor comprises increasing power from the local energy storage device to the application sensor.

12. The wireless application sensor system of claim 11, further comprising a switch operably connected between the application sensor and the local energy storage device, the switch configured to controllably conduct electrical energy from the local energy storage device to the application sensor under control of the control module.

13. The wireless application sensor system of claim 10, further comprising an analog-to-digital converter configured to convert an output signal from the low-power MEMS sensor to a digital format, and to provide the digitized output signal to the control module.

14. The wireless application sensor system of claim 10, further comprising a comparator configured to compare and output of the low-power MEMS sensor to a predetermined level, and to provide the result of the comparison to the control module.

15. The wireless application sensor system of claim 10, further comprising a processor operably coupled to the application sensor, the processor configured to control the application sensor.

16. The wireless application sensor system of claim 15, wherein the control module is further configured to provide power to the processor when the low-power MEMS sensor detects a precursor motion.

17. A system for controlling a safety system in a vehicle, comprising:
    a low-power-consumption means for monitoring at least one motion of the vehicle when the vehicle is stationary;
    an application sensor means, the application sensor means being separate from low-power-consumption means;
    a local energy storage means, the local energy storage means configured to supply power to the low-power MEMS sensor and to the application sensor;
    a wireless communications interface means operably coupled to the application sensor means and configured to provide a communications link to a safety system controller in the vehicle; and
    a control means configured to selectively supply power from the local energy storage means to the application sensor means when the low-power consumption means detects a precursor motion,
    wherein the safety system controller is configured to control a safety system in the vehicle in response to a signal from the application sensor means.

18. The system for controlling a safety system in a vehicle according to claim 17, further comprising a switching means operably connected between the application sensor means and the local energy storage means, the switching means configured to controllably conduct electrical energy from the local energy storage means to the application sensor means under control of the control means.

19. The system for controlling a safety system in a vehicle according to claim 17, further comprising an analog-to-digital converter means configured to convert an output signal from the a low-power-consumption means to a binary format, and to provide the binary signal to the control means.

20. The system for controlling a safety system in a vehicle according to claim 17, further comprising a processor means operably coupled to the application sensor means, the processor means configured to control the application sensor means.

* * * * *